US012774362B2

(12) United States Patent
An et al.

(10) Patent No.: US 12,774,362 B2
(45) Date of Patent: Oct. 27, 2026

(54) THERMOPLASTIC POLYURETHANE COMPOSITION FOR INJECTION MOLDING AND A METHOD FOR MANUFACTURING THE SAME

(71) Applicants: HYUNDAI MOTOR COMPANY, Seoul (KR); KIA CORPORATION, Seoul (KR); DONGSUNG CHEMICAL Co., Ltd., Busan (KR); HANWHA ADVANCED MATERIALS CORPORATION, Seoul (KR)

(72) Inventors: Boo Youn An, Hwaseong-si (KR); In Soo Han, Uiwang-si (KR); Sang Hyuk Lee, Ulsan (KR); Jae Chan Lee, Busan (KR); Hoon Jeong Kim, Sejong-si (KR); Gyu Min Lee, Daejeon (KR); Sung Bok Kwak, Suwon-si (KR); Dong Ju Lee, Suwon-si (KR); Jae Yong Lee, Suwon-si (KR)

(73) Assignees: HYUNDAI MOTOR COMPANY, Seoul (KR); KIA CORPORATION, Seoul (KR); DONGSUNG CHEMICAL Co., Ltd., Busan (KR); HANWHA ADVANCED MATERIALS CORPORATION, Seoul (KR)

( * ) Notice: Subject to any disclaimer, the term of this patent is extended or adjusted under 35 U.S.C. 154(b) by 837 days.

(21) Appl. No.: 18/135,336

(22) Filed: Apr. 17, 2023

(65) Prior Publication Data

US 2024/0132652 A1 Apr. 25, 2024

(30) Foreign Application Priority Data

Oct. 5, 2022 (KR) ........................ 10-2022-0127265

(51) Int. Cl.

| | |
|---|---|
| ***C08G 18/12*** | (2006.01) |
| ***B29C 48/00*** | (2019.01) |
| ***C08G 18/32*** | (2006.01) |
| ***C08G 18/38*** | (2006.01) |
| ***C08G 18/42*** | (2006.01) |
| *B29K 75/00* | (2006.01) |

(52) U.S. Cl.

CPC ............ *C08G 18/12* (2013.01); *B29C 48/022* (2019.02); *C08G 18/3206* (2013.01); *C08G 18/3855* (2013.01); *C08G 18/4238* (2013.01); *C08G 18/425* (2013.01); *B29K 2075/00* (2013.01)

(58) Field of Classification Search

None

See application file for complete search history.

(56) References Cited

U.S. PATENT DOCUMENTS

| | | | | |
|---|---|---|---|---|
| 4,108,814 | A * | 8/1978 | Reiff | C08G 18/5072 524/840 |
| 6,753,402 | B1 * | 6/2004 | Bauer | C08G 65/2609 252/182.28 |
| 9,855,688 | B2 | 1/2018 | Ahn et al. | |
| 2004/0116646 | A1 * | 6/2004 | Choi | C08G 18/0895 264/28 |
| 2006/0287419 | A1 * | 12/2006 | Park | C08G 18/4252 524/277 |
| 2017/0029554 | A1 * | 2/2017 | Ahn | C08G 18/7671 |
| 2020/0216602 | A1 * | 7/2020 | Son | C08G 18/0895 |
| 2021/0101550 | A1 * | 4/2021 | Son | B29C 44/42 |
| 2022/0204680 | A1 | 6/2022 | Kwon et al. | |
| 2022/0265905 | A1 * | 8/2022 | Bai | A61L 29/06 |

FOREIGN PATENT DOCUMENTS

| | | | | |
|---|---|---|---|---|
| CN | 107446105 | B * | 6/2020 | C08G 18/48 |
| KR | 20050017479 | A | 2/2005 | |
| KR | 20120049074 | A | 5/2012 | |
| KR | 20170013099 | A | 2/2017 | |
| KR | 20200121725 | A | 10/2020 | |

* cited by examiner

*Primary Examiner* — Robert S Jones, Jr.
*Assistant Examiner* — Lily K Sloan
(74) *Attorney, Agent, or Firm* — Lempia Summerfield Katz LLC

(57) ABSTRACT

The present disclosure relates to a thermoplastic polyurethane composition for injection molding and a method for manufacturing the same. Specifically, the thermoplastic polyurethane composition includes 0.5% by weight to 10.0% by weight of a sulfonate diol, 13% by weight to 60% by weight of an isocyanate, 30% by weight to 70% by weight of an ether-containing polyester polyol, and 5% by weight to 40% by weight of a chain extender.

10 Claims, 1 Drawing Sheet

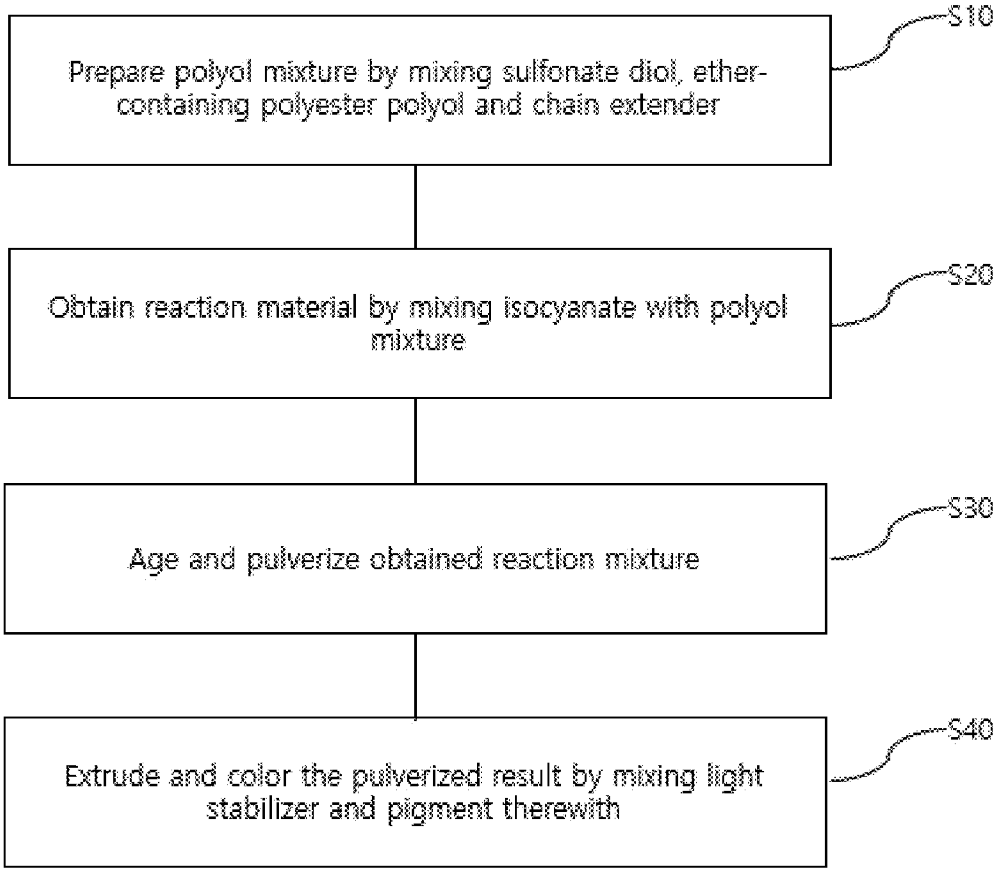
Prepare polyol mixture by mixing sulfonate diol, ether-containing polyester polyol and chain extender
S10
Obtain reaction material by mixing isocyanate with polyol mixture
S20
Age and pulverize obtained reaction mixture
S30
Extrude and color the pulverized result by mixing light stabilizer and pigment therewith
S40

THERMOPLASTIC POLYURETHANE COMPOSITION FOR INJECTION MOLDING AND A METHOD FOR MANUFACTURING THE SAME

CROSS-REFERENCE TO RELATED APPLICATION

This application claims under 35 U.S.C. § 119(a) the benefit of priority to Korean Patent Application No. 10-2022-0127265 filed on Oct. 5, 2022, the entire contents of which are incorporated herein by reference.

BACKGROUND

(a) Technical Field

The present disclosure relates to a thermoplastic polyurethane composition for injection molding and a method for manufacturing the same.

(b) Background Art

Methods of processing soft-type skin materials for crush pad panels of automotive interior materials in the related art include vacuum molding, PSM (powder slush molding), RIM (reaction injection molding), LIM (laminate insert molding), leather wrapping, and the like. Herein, the panel skin material refers to a soft pad-type skin material and is located on a core material and a pad material.

Meanwhile, processes in the related art have problems such as complexity, a decrease in the degree of design freedom and a decrease in affective quality. Accordingly, there have been demands for development of a thermoplastic polyurethane composition having excellent injection moldability while having excellent injection molded article performance, durability, and the like.

SUMMARY OF THE DISCLOSURE

The present disclosure has been made in view of the above, and an object of the present disclosure is to provide a thermoplastic polyurethane composition having improved injection moldability while having excellent injection molded article performance, durability, and the like, and a method for manufacturing the same.

The object of the present disclosure is not limited to the object mentioned above. The object of the present disclosure becomes clearer from the following description, and is realized by the compositions and methods described in the claims and combinations thereof.

A thermoplastic polyurethane composition according to the present disclosure includes 0.5% by weight to 10.0% by weight of a sulfonate diol, 13% by weight to 60% by weight of an isocyanate, 30% by weight to 70% by weight of an ether-containing polyester polyol, and 5% by weight to 40% by weight of a chain extender.

The sulfonate diol may be a bis-1,4-((2-hydroxypropoxy)-2-propoxy)-butanesulfonate sodium salt represented by the following Chemical Formula 1.

[Chemical Formula 1]

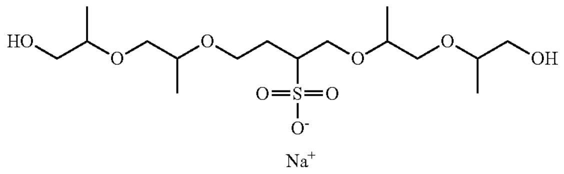

The isocyanate may include methylene diphenyl diisocyanate (MDI), toluene diisocyanate (TDI), hexamethylene diisocyanate (HDI), isophorone diisocyanate (IPDI), dicyclohexylmethane diisocyanate (H12MDI), or combinations thereof.

The polyester polyol may have a hydroxyl group value in a range of 1 mgKOH/g to 250 mgKOH/g.

The polyester polyol may include multifunctional carboxylic acid compounds, multifunctional alcohol compounds, polytetramethylene glycol (PTMG), or combinations thereof.

The polyester polyol may include, based on a total weight thereof, 30% by weight to 70% by weight of the multifunctional carboxylic acid compound, 10% by weight to 50% by weight of the multifunctional alcohol compound, and 20% by weight to 60% by weight of the polytetramethylene ether.

The chain extender may include 1,4-butanediol, ethylene glycol, diethylene glycol, hexanediol, hydroquinone ether, or combinations thereof.

The thermoplastic polyurethane composition may further include, with respect to 100 parts by weight of the whole composition, 0.1 parts by weight to 5 parts by weight of a light stabilizer and 0.1 parts by weight to 2 parts by weight of a pigment.

The thermoplastic polyurethane composition may have a melt flow index, which is measured in accordance with ISO 1133, in a range of 100 g/10 mins to 200 g/10 mins (185° C., 2.16 kg).

A method for manufacturing a thermoplastic polyurethane according to the present disclosure includes: preparing a polyol mixture by mixing 0.5% by weight to 10.0% by weight of a sulfonate diol, 30% by weight to 70% by weight of an ether-containing polyester polyol and 5% by weight to 40% by weight of a chain extender; and obtaining a reaction material by mixing 13% by weight to 60% by weight of an isocyanate with the polyol mixture.

The preparation of a polyol mixture may be performed for 1 minute to 10 minutes at a temperature in a range of 30° C. to 100° C.

The obtaining of a reaction material may be mixing for 1 minute to 10 minutes at a rate in a range of 300 rpm to 1,000 rpm.

The method for manufacturing a thermoplastic polyurethane may further include aging and pulverizing the obtained reaction material, and extruding and coloring the pulverized result by mixing, with respect to 100 parts by weight of the pulverized result, 0.1 parts by weight to 5 parts by weight of a light stabilizer, and 0.1 parts by weight to 2 parts by weight of a pigment.

In the aging and pulverizing, the obtained reaction material may be aged for 1 hour to 48 hours at a temperature in a range of 60° C. to 140° C., and then pulverized at a temperature of 0° C. or lower.

The extruding and coloring may be performed at a temperature in a range of 150° C. to 300° C.

The present disclosure may include a molded article manufactured using the thermoplastic polyurethane composition.

By mixing an isocyanate, an ether-containing polyester polyol, a chain extender, and a sulfonate diol in a specific content, a thermoplastic polyurethane composition according to the present disclosure provides a side chain effect in a soft segment due to chemical bonding in the polyurethane molecule, and is thereby readily injection molded.

A molded article according to the present disclosure is capable of having excellent molded article performance such as surface feel and embossing quality, excellent durability performance such as heat aging resistance, light aging resistance and abrasion resistance, and excellent safety performance such as fogging and air bag deployment performance.

In addition, a method for manufacturing a thermoplastic polyurethane composition according to the present disclosure is capable of securing an equivalent level of performance and excellent appearance quality compared to a skin material manufactured using an existing method, and particularly, has advantages in that a powder manufacturing process is not required compared to an existing PSM method, the process is simplified, and process costs are reduced.

In addition, among molding methods, the method can contribute to enhancing fuel efficiency due to weight lightening by allowing molding to thin and uniform thickness, and effects of reducing costs and waste can be obtained due to a small skin material scud area.

The effects of the present disclosure are not limited to the effects mentioned above. It should be understood that the effects of the present disclosure include all effects that can be inferred from the following description.

BRIEF DESCRIPTION OF THE DRAWING

The FIGURE depicts a flow chart showing an example of a method for manufacturing a thermoplastic polyurethane composition.

DETAILED DESCRIPTION

The above objects, other objects, features, and advantages of the present disclosure are understood through the following embodiments related to the accompanying drawings. However, the present disclosure is not limited to the embodiments described herein and may be embodied in other forms. Rather, the embodiments introduced herein are provided so that the disclosed content may become thorough and complete, and the spirit of the present disclosure may be sufficiently conveyed to those skilled in the art.

In the present specification, terms such as "comprise" or "have" are intended to designate that a feature, number, step, operation, component, part, or combinations thereof described in the specification exists, but it should be understood that the terms do not preclude the possibility of the existence or addition of one or more other features, numbers, steps, operations, components, parts, or combinations thereof.

Unless otherwise specified, all numbers, values, and/or expressions expressing quantities of components, reaction conditions, polymer compositions and formulations used in the present specification are approximate values obtained by reflecting various uncertainties of the measurement that arise in obtaining these values among others in which these numbers are different. Therefore, they should be understood as being modified by the term "about" in all cases. Further, when a numerical range is disclosed in this description, such a range is continuous, and includes all values from a minimum value of such a range to a maximum value including the maximum value, unless otherwise indicated. Furthermore, when such a range refers to an integer, such a range includes all integers including from a minimum value to a maximum value including the maximum value, unless otherwise indicated.

A thermoplastic polyurethane composition according to the present disclosure includes 0.5% by weight to 10.0% by weight of a sulfonate diol, 13% by weight to 60% by weight of an isocyanate, 30% by weight to 70% by weight of an ether-containing polyester polyol, and 5% by weight to 40% by weight of a chain extender. Specifically, the thermoplastic polyurethane composition may further include, with respect to 100 parts by weight of the whole thermoplastic polyurethane composition, 0.1 parts by weight to 5 parts by weight of a light stabilizer, and 0.1 parts by weight to 2 parts by weight of a pigment.

Next, each component forming the thermoplastic polyurethane composition according to the present disclosure is more specifically described as follows.

(A) Sulfonate Diol

The sulfonate diol includes a hydroxyl group and may have an ion center. The sulfonate diol facilitates injection flowability through weakening intermolecular bonding force through the side chain and is ultimately capable of improving durability by generating ionic bonds after injection.

In a soft thermoplastic polyurethane, the non-crystalline area may increase resin's stickiness, thereby reducing demoldability of the injection molding process. Further, although wax-type additives may be used in order to improve such demoldability, this has a problem of migration to the surface under a specific condition due to a problem of compatibility with the thermoplastic polyurethane.

Meanwhile, by using the sulfonate diol having a hydroxyl group used in present disclosure, it is possible to solve the problem of migration to the outside since the sulfonate diol is positioned inside the molecular structure after forming chemical bonds with the isocyanate when manufacturing the polyurethane.

In particular, under a process using heat, the side chain of ions in the sulfonate diol enhances a melt flow above a melting temperature (Tm) by weakening intermolecular bonding force in a molten state without functioning of ionic bonds, and may function to help with improving anti-scratch and abrasion resistance below a melting temperature (Tm) by producing ionic bonds through rearranging the ion chain while solid/liquid phases coexist and thereby strengthening intermolecular bonding of the ionic bonds.

Accordingly, the sulfonate diol induces the ionic bonds in the thermoplastic polyurethane molecule during addition polymerization, thereby improving flowability and demoldability during the injection process work in addition to obtaining abrasion resistance and anti-scratch of a final product.

The sulfonate diol according to the present disclosure may be included in 0.5% by weight to 10% by weight based on the whole composition. When the content of the sulfonate diol is outside the above-mentioned range, there may be a problem in that properties of the present disclosure such as improving durability while facilitating injection flowability in molding a final injection article may not be obtained.

Specifically, the sulfonate diol may be a bis-1,4-((2-hydroxypropoxy)-2-propoxy)-butanesulfonate sodium salt represented by the following Chemical Formula

[Chemical Formula 1]

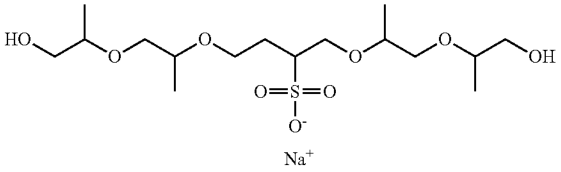

(B) Isocyanate

The isocyanate is a component added when manufacturing polyurethane and performs a role of producing a chemical reaction with the polyol component.

The isocyanate may perform a role of, through the chemical reaction with the polyol component, making distribution of the hard segment and the soft segment in the polyurethane structure uniform.

The isocyanate may be included in 13% by weight to 60% by weight based on the whole composition. Including the isocyanate in a content of less than 13% by weight may cause decline in heat resistance by reducing the hard segment domain in the thermoplastic polyurethane structure and thereby decreasing a melting temperature (Tm). On the other hand, including the isocyanate in a content of greater than 60% by weight may cause decline in affective quality by increasing the hard segment domain due to the use in excess.

Specifically, the isocyanate may methylene diphenyl diisocyanate (MDI), toluene diisocyanate (TDI), hexamethylene diisocyanate (HDI), isophorone diisocyanate (IPDI), dicyclohexylmethane diisocyanate (H12MDI), or combinations thereof.

(C) Polyester Polyol

The polyester polyol may include an ether.

The polyester polyol may be included in 30% by weight to 70% by weight based on the whole composition. Including the polyester polyol in a content of less than 30% by weight may cause a decrease in affective quality due to lack of the soft segment. On the other hand, including the polyester polyol in a content of greater than 70% by weight may cause decline in heat resistance since the thermoplastic polyurethane has a decreased melting point by lack of the hard segment due to the use in excess.

The polyester polyol may include multifunctional carboxylic acid compounds, multifunctional alcohol compounds, polytetramethylene glycol (PTMG), or combinations thereof.

Specifically, the polyester polyol may include, based on a total weight thereof, 40% by weight to 80% by weight of the multifunctional carboxylic acid compound and 20% by weight to 100% by weight the polytetramethylene glycol. In addition, the polyester polyol may include, based on a total weight thereof, 30% by weight to 70% by weight of the multifunctional carboxylic acid compound, 10% by weight to 50% by weight of the multifunctional alcohol compound and 20% by weight to 60% by weight of the polytetramethylene ether.

The polyester polyol may have a hydroxyl group value of 1 mgKOH/g to 250 mgKOH/g. In some examples, the polyester polyol may be an ether-containing polyester polyol having a hydroxyl group value in a range of 11.22 mgKOH/g to 224.11 mg KOH/g.

(D) Chain Extender

In the present disclosure, the chain extender may be added to form the hard segment in addition to extending molecules of the thermoplastic polyurethane.

The chain extender may be included in 5% by weight to 40% by weight based on the whole composition. Including the chain extender in a content of less than 5% by weight results in a low hard segment content, which may reduce heat aging resistance by lowering a melting point of the thermoplastic polyurethane. On the other hand, including the chain extender in a content of greater than 40% by weight may reduce affective quality of the thermoplastic polyurethane by increasing hardness due to the use in excess.

Specifically, the chain extender may include 1,4-butanediol, ethylene glycol, diethylene glycol, hexanediol, hydroquinone ether, or combinations thereof.

(E) Additive

The additive is a component for providing various functionalities to the thermoplastic polyurethane composition, and as the additive, those known in the art may be used without particular limit in a range of not impairing the effects of the present disclosure.

In the present disclosure, a light stabilizer and a pigment may be used as the additive.

As the light stabilizer, those capable of increasing resistance to ultraviolet light by providing light resistance stability may be used.

The light stabilizer may be included in 0.1 parts by weight to 5 parts by weight with respect to 100 parts by weight of the whole thermoplastic polyurethane composition.

As the light stabilizer, UV absorbers, amine-based light stabilizers (HALS: hindered amine light stabilizers) or mixtures thereof may be used.

The pigment may be introduced for color toning of a final molded article. The pigment may be included in 0.1 parts by weight to 2 parts by weight based on 100 parts by weight of the whole thermoplastic polyurethane composition. Specifically, as the pigment, inorganic-based pigments, organic-based pigments or mixtures thereof may be used.

Lastly, the thermoplastic polyurethane composition according to the present disclosure may have a melt flow index, which is measured in accordance with ISO 1133, in a range of 100 g/10 mins to 200 g/10 mins (185° C., 2.16 kg). When the thermoplastic polyurethane composition has a melt flow index of less than 100 g/10 mins, fluid flowability is reduced during skin injection, causing unmolding. On the other hand, when the thermoplastic polyurethane composition has a melt flow index of greater than 200 g/10 mins, the molecular weight of the thermoplastic polyurethane decrease, which may cause decline in mechanical properties, and decreases in long-term durability and abrasion resistance.

In other aspect, the present disclosure relates to a method for manufacturing the thermoplastic polyurethane composition. Hereinafter, the present disclosure is described in more detail with reference to accompanying FIG.

The FIGURE is a flow chart showing an example of a method for manufacturing the thermoplastic polyurethane composition according to the present disclosure.

The method for manufacturing a thermoplastic polyurethane composition according to the present disclosure includes, in step S10, preparing a polyol mixture by mixing 0.5% by weight to 10.0% by weight of a sulfonate diol, 30% by weight to 70% by weight of an ether-containing polyester polyol, and 5% by weight to 40% by weight of a chain extender. The method further includes, in step S20, obtaining a reaction material by mixing 13% by weight to 60% by weight of an isocyanate with the polyol mixture.

Specifically, the method for manufacturing a thermoplastic polyurethane according to the present disclosure may further include, in step S30, after step S20, aging and pulverizing the obtained reaction material. The method may further include, in act S40, extruding and coloring the pulverized result by mixing, with respect to 100 parts by weight of the pulverized result, 0.1 parts by weight to 5 parts by weight of a light stabilizer, and 0.1 parts by weight to 2 parts by weight of a pigment.

Prior to describing the manufacturing method, detailed description on the sulfonate diol, the polyester polyol, the chain extender, the isocyanate, the light stabilizer, and the pigment used in the thermoplastic polyurethane composition will not be provided because these are specifically described above.

Hereinafter, each step of the method for manufacturing a thermoplastic polyurethane composition according to the present disclosure is described as follows.

First, the manufacturing method according to the present disclosure may further include, prior to the step S10, preparing the ether-containing polyester polyol.

Specifically, in the preparing of a polyester polyol, 30 parts by weight to 70 parts by weight of a multifunctional carboxylic acid compound, 10 parts by weight to 50 parts by weight of a multifunctional alcohol compound, and 20 parts by weight to 60 parts by weight of polytetramethylene ether glycol may be mixed. Herein, the mixture may be primarily heated from room temperature to 140° C. to 160° C., and then kept for about 60 minutes to 120 minutes at the primary elevated temperature. Subsequently, the mixture may be secondarily heated to 150° C. to 230° C., and then kept for 10 minutes to 120 minutes at the secondary elevated temperature.

Herein, vacuum of 650 mmHg to 760 mmHg may be applied until the acid value becomes 1 mgKOH/g or less at the secondary maintaining temperature. When the acid value of the mixture becomes 1 mgKOH/g or less, the reaction is terminated to finally prepare the ether-containing polyester polyol. Herein, the ether-containing polyester polyol may have a hydroxyl group value of 1 mgKOH/g to 250 mgKOH/g. In some examples, the ether-containing polyester polyol may have the hydroxyl group value in a range of 11.22 mgKOH/g to 224.11 mgKOH/g.

Subsequently, in the step S10, 0.5% by weight to 10.0% by weight of the sulfonate diol, 30% by weight to 70% by weight of the ether-containing polyester polyol, and 5% by weight to 40% by weight of the chain extender are mixed to prepare a polyol mixture.

The step S10 may be performed by stirring the polyol mixture for 1 minute to 10 minutes at a temperature in a range of 30° C. to 100° C. In the step S10, the polyol compound, the chain extender and the sulfonate diol may be evenly mixed when mixed under the above-mentioned condition.

Subsequently, in the step S20, 13% by weight to 60% by weight of the isocyanate based on the whole composition is mixed with the polyol mixture to obtain a reaction material.

In the step S20, the reaction material may be obtained through mixing for 1 minute to 10 minutes at a rate in a range of 300 rpm to 1,000 rpm. In the step S20, the polyol mixture and the isocyanate may be polymerized when mixed under the above-mentioned condition.

In the step S20, the isocyanate compound and the ether-containing polyester polyol may be mixed to substantially prepare polyurethane.

In the steps S30 and S40 performed after the step S20, the obtained reaction material may be molded into pellets that are processable into a product by pulverizing, extruding and coloring processes.

In the step S30, the obtained reaction material may be aged and pulverized.

In the step S30, the obtained reaction material is aged for 1 hour to 48 hours at a temperature of 60° C. to 140° C., and then cooled to a temperature of 0° C. or lower to perform pulverization of the obtained reaction material.

Lastly, in the step S40, 0.1 parts by weight to 5 parts by weight of the light stabilizer and 0.1 parts by weight to 2 parts by weight of the pigment may be mixed with respect to 100 parts by weight of the pulverized result to perform extruding and coloring processes. The step S40 may be performed at a temperature in a range of 150° C. to 300° C.

In still another aspect, the present disclosure relates to a molded article manufactured using the thermoplastic polyurethane composition. The molded article may be manufactured by injection molding.

The molded article of the present disclosure is readily injection molded, and may have excellent molded article performance such as surface feel and embossing quality, excellent durability performance such as heat aging resistance, light aging resistance and abrasion resistance, and excellent safety performance such as air bag deployment performance and fogging.

In addition, among molding methods, the present disclosure may contribute to enhancing fuel efficiency due to weight lightening by allowing molding to thin and uniform thickness, and effects of reducing costs and waste may be obtained due to a small skin material scud.

Accordingly, the thermoplastic polyurethane composition according to the present disclosure is not limited in the field of use, but may be used as a skin material for an automotive interior material. Herein, the skin material may have a thickness of 0.1 mm to 10 mm, (e.g., 1 mm).

In addition, the molded article according to the present disclosure is capable of securing an equivalent level of performance and excellent appearance quality using an injection method compared to a skin material manufactured using an existing method, and particularly, the process may be simplified, and process costs may be reduced compared to an existing PSM method since a powder manufacturing process is not required.

Hereinafter, the present disclosure is more specifically described through specific Examples. The following Examples are just examples to help understand the present disclosure, and the scope of the present disclosure is not limited thereto.

First, Example 1 and Comparative Examples 1 to 4 were prepared using methods as follows.

Example 1

44% by weight (50 kg) of adipic acid, 20% by weight (22.8 kg) of 1,4-butylene glycol and 36% by weight (40.9 kg) of polytetramethylene ether glycol having a hydroxyl value of 448.8 mgKOH/g were mixed, and after raising the temperature from room temperature to 150° C., the mixture was kept for about 60 minutes at 150° C., the primary elevated temperature.

Then, after raising the temperature again from 150° C. to 230° C., the mixture was kept for about 30 minutes at 230° C., the secondary elevated temperature. Then, after applying a vacuum of 720 mmHg at the secondary elevated temperature, the reaction was terminated when the acid value became 0.3 mgKOH/g or less to prepare an ether-containing polyester polyol having 12.3% of condensed water and a hydroxyl group value of 74.8 mgKOH/g.

Subsequently, 66.4% by weight (71 kg) of the ether-containing polyester polyol, 15.7% by weight (16.7 kg) of a chain extender (HQEE) and 4.6% by weight (4.9 kg) of a sulfonate diol were primarily mixed for 3 minutes at 60° C. Herein, GS-7Q of G.N. Technology was used as the sulfonate diol.

Then, 13.3% by weight (14.2 kg) of an isocyanate (H12MD1) (NCO/OH molar ratio was 0.985) was introduced thereto, and the result was secondarily mixed for 3 minutes at a rate of 500 rpm to obtain a polymer, and the polymer was aged for 8 hours at 80° C.

Subsequently, the polymer was pulverized at a temperature of 0° C. or lower to be prepared into a chip (flake-type) form, and the result was extruded at 180° C. to be prepared into a pellet form.

Herein, when preparing the thermoplastic polyurethane base resin (TPU base resin) for injection molding, 0.28 parts by weight of a separate antioxidant, 0.28 parts by weight of an anti-hydrolysis agent and 1.5 parts by weight of a light stabilizer were simply mixed and added thereto with respect to 100 parts by weight of the polymer. Then, pellets having a melt flow index, which was measured in accordance with ISO1133, of 145 g/10 mins under a condition of 185° C. and a load of 2.16 kg were obtained.

The prepared pellets were blended with 0.93 parts by weight (1 kg) of a pigment with respect to 100 parts by weight of the black-based polymer, and the result was extruded at 180° C. to be prepared into a pellet form.

Then, using the obtained thermoplastic polyurethane in a pellet form, a skin material was prepared according to an injection molding method, and after completing a molded article formed with a core material, a pad material and the skin material, a part thereof was taken as a sample.

Comparative Example 1

Preparation was performed in the same manner as in Example 1, except that, in the secondary mixing step of Example 1, 13.5% by weight (14.4 kg) of an isocyanate (H12MD1) with the NCO/OH molar ratio being upward adjusted to 0.990 was added, and a thermoplastic polyurethane having a melt flow index by ISO1133 of 89 g/10 mins under a condition of 185° C. and a load of 2.16 kg was prepared, and a skin material obtained after injection processing the prepared thermoplastic polyurethane was collected.

Comparative Example 2

Preparation was performed in the same manner as in Example 1, except that, in the secondary mixing step of Example 1, 13.0% by weight (13.9 kg) of an isocyanate (H12MD1) with the NCO/OH molar ratio being downward adjusted to 0.980 was added, and a thermoplastic polyurethane having a melt flow index by IS01133 of 213 g/10 mins under a condition of 185° C. and a load of 2.16 kg was prepared, and a skin material obtained after injection processing the prepared thermoplastic polyurethane was collected.

Comparative Example 3

Preparation was performed in the same manner as in Example 1, except that a thermoplastic polyurethane was prepared without mixing a sulfonate diol thereto, and a skin material obtained after injection processing the prepared thermoplastic polyurethane was collected.

Comparative Example 4

Preparation was performed in the same manner as in Example 1, except that a thermoplastic polyurethane was prepared with Luwax E powder being blended thereto instead of the sulfonate diol in Example 1, and a skin material obtained after injection processing the prepared thermoplastic polyurethane was collected.

Herein, the Luwax E powder is wax manufactured by Clariant, and the product component includes an ester of montanic acids with multifunctional alcohols. Experimental Example 1

Each of the thermoplastic polyurethanes prepared in Example 1 and Comparative Examples 1 to 4 was injection molded in the manner as in the following Table 1, and appearing mechanical properties were evaluated.

Table 1 shows, as a process condition for injection molding, conditions optimally set for the appearance to be most favorably molded.

TABLE 1

| Item | Unit | Example 1 | Comparative Example 1 | Comparative Example 2 | Comparative Example 3 | Comparative Example 4 |
|---|---|---|---|---|---|---|
| Nozzle Temperature | ° C. | 205 | 205 | 205 | 205 | 205 |
| Cylinder Temperature | ° C. | 205 | 205 | 205 | 205 | 205 |
| MAX Injection Pressure | Mpa | 36 | 62 | 29 | 41 | 38 |
| Injection Time | Sec | 2.7 | 2.7 | 2.7 | 2.7 | 2.7 |
| Cooling Time | Sec | 50 | 50 | 50 | 50 | 50 |
| Mold Temperature | ° C. | 40 | 40 | 40 | 40 | 40 |

Evaluation Method

Specific gravity: specific gravity was measured using a water displacement method according to the method specified in ASTM D 792.

Hardness: hardness was measured using a Shore A hardness tester according to the rule of ASTM D 2240.

Tensile strength: tensile strength was measured using a device manufactured by Instron according to the rule of ASTM D 412, and the load was 5 kN, the specimen was dumbbell No. 3-type, and the tensile speed was 200 m/min.

(4) Anti-scratch: anti-scratch was evaluated from the collected skin materials. To measure the anti-scratch, the test piece was placed in a flat abrasion tester, then a canvas was attached to a friction element, and after abrading a surface of the test piece under a test condition of 10 round trips with a load of 1 kg and a rate of 30 rpm, a difference in the gloss (ΔG) and the surface appearance were observed. Herein, the appearance was classified by the presence/absence of damage to the surface of the test piece. When the surface damage was significant, it was classified as grade 1, and when the surface damages were not recognized, it was classified as grade 5.

(5) Long-term durability (heat aging resistance and light aging resistance): from the collected skin materials, long-term durability was evaluated. As the heat aging resistance, a color difference was measured using a known color difference meter after aging the collected skin materials for 500 hours at 120° C. using a thermos-hygrostat. As the light aging resistance, the collected skin materials were aged using an Atlas CI4000 Xenon Arc Weather-O-meter that is an accelerated light resistance tester, and a rate of changes in the gloss and changes in the color difference of the samples were measured using a gloss meter and a color difference meter. Herein, as the test condition for the light aging resistance, the wavelength band was 300 nm to 400 nm and the light intensity was 70 W/m 2, and a total of 126 $MJ/m^2$ was tested under a condition of the specimen surface temperature of 89° C.

(6) Moisture aging resistance: from the collected skin materials, moisture aging resistance was evaluated. As the moisture aging resistance, the collected skin materials were left unattended for 7 days under a condition of 50±5° C. and relative humidity of 95±3% using a thermos-hygrostat, and then the appearances were compared. Herein, the blooming phenomenon means changes in the appearance due to whitening or surface lamination of foreign substances caused by a part of the additives or internal raw materials migrating to the epidermis layer.

(7) Abrasion resistance: from the collected skin materials, abrasion resistance was evaluated. The abrasion resistance was evaluated using the Taber abrasion test specified in ASTM D 4060. The used abrasion wheel was H18, the load was 1 kg, the preliminary abrasion was 100 times, and the rotation speed was 60 rpm.

Properties were measured using the methods as above, and the results were classified into grades 5 to 1 in the order of good to bad for each item, and shown in the following Tables 2 and 3. Herein, the injection machine has a die clamping force of 3,000 tons, and the mold forming part has a size of 1,500 mm×500 mm×1 mm (width×length×thickness).

The injection mold gate is a film gate, and there are a total of three. They are connected by a hot runner valve nozzle to which a delay sequence is applicable.

TABLE 2

| Item | Unit | Example 1 | Comparative Example 1 | Comparative Example 2 | Comparative Example 3 | Comparative Example 4 |
|---|---|---|---|---|---|---|
| Injection Molded Article Appearance and Workability | Filling Rate (Grade) | 5 | 4 | 5 | 4 | 5 |
| | Gas Marks (Grade) | 5 | 5 | 4 | 4 | 5 |
| | Weld Line (Grade) | 5 | 4 | 3 | 4 | 4 |
| | Sink Mark (Grade) | 5 | 5 | 5 | 5 | 5 |
| | Demold-ability | 5 | 5 | 4 | 3 | 4 |

TABLE 3

| Item | | Unit | Ex. 1 | Comp. Ex. 1 | Comp. Ex. 2 | Comp. Ex. 3 | Comp. Ex. 4 |
|---|---|---|---|---|---|---|---|
| Specific Gravity (ASTM D 792) | | — | 1.135 | 1.135 | 1.135 | 1.135 | 1.135 |
| Hardness (ASTM D 2240) | | Shore A | 84 | 84 | 84 | 84 | 84 |
| Tensile Strength (ASTM 412) | | $Kgf/cm^2$ | 100 | 128 | 83 | 108 | 102 |
| Dry Towel Abrasion | Change in Gloss (ΔG) | — | 0.0 | 0.0 | 0.1 | 0.2 | 0.1 |
| | Presence/Absence of Surface Damages | Grade | 5 | 5 | 4 | 3 | 4 |
| Heat Aging Resistance | | Rate of Change in Gloss (%) | 25 | 24 | 31 | 28 | 29 |
| | | ΔE | 0.3 | 0.3 | 0.5 | 0.3 | 0.4 |
| Light Aging Resistance | | Rate of Change in Gloss (%) | 26 | 26 | 27 | 26 | 27 |
| | | ΔE | 0.75 | 0.74 | 0.94 | 0.86 | 1.02 |
| Moisture Aging Resistance | | | Normal | Normal | Normal | Normal | Blooming Occurred |
| Abrasion Resistance (ASTM D 4060) | | | 15 | 10 | 30 | 150 | 150 |

According to the results of Tables 2 and 3, Comparative Example 1, having a melt flow index of 89 g/10 mins, had low flowability and thereby had a decreased filling rate, and unmolding occurred even under the optimized injection molding condition.

In addition, Comparative Example 2, having a melt flow index of 213 g/10 mins, had high flowability and thereby had no abnormality in the injection moldability and the appearance, however, it was identified that the molded article skin material had tensile strength relatively decreased by about 20%.

In addition, in Comparative Example 3 in which a sulfonate diol was not added, demoldability was significantly reduced during injection molding, anti-scratch was grade 3, which is relatively low compared to the Example, and abrasion resistance was significantly reduced.

In addition, in Comparative Example 4 using Luwax E powder instead of the sulfonate diol, it was identified that demoldability was slightly reduced, and anti-scratch was low of grade 4. In addition, a blooming phenomenon occurred, resulting in poor appearance, and abrasion resistance was significantly reduced.

On the other hand, Example 1 had relatively most favorable appearance compared to Comparative Examples 1 to 4 after molding using a C/pad IP skin material injection method, and injection workability including demoldability was favorable.

In addition, Example 1 had low hardness and thereby had excellent user surface feel, and it was identified that other properties were not only suitable for all standard conditions generally required for automobiles, but also excellent.

In addition, in Example 1, it was seen that anti-scratch was determined to be grade 4 or higher in which surface damages were slightly recognized, and it was a level allowing non-painting. Herein, an instrument panel of an automobile may have a very large amount of sunlight irradiated thereto compared to other parts, which may cause polymer degradation, and therefore, light aging resistance and heat aging resistance are particularly important evaluation items.

Experimental Example 2

After completing a C/pad cockpit module by combining the obtained skin material prepared and injection molded in Example 1, a core material and a pad material, an air bag deployment performance test was conducted under a test condition of the following Table 4 (performance test specified in Hyundai Motor Company and Kia Motors Corporation). The results are shown in the following Table 5.

TABLE 4

| Item | Deployment Test (Base Line) | Environmental Exposure Test (Heat Resistance Cycle) | Heat Aging Test |
|---|---|---|---|
| Test Procedure | — | −35° C. (6 H)→21° C., 95% (6 H) →71° C. 75% (6 H)→105° C. (6 H) = 1 Time (14 Cycles)<br>1 Time = Temperature, Humidity, Vibration (Only for 1 Car)<br>14 Times = Temperature, Humidity | Left unattended for 400 hours at 105° C. and then 8 hours at 21° C. |
| Condition for Being Left Unattended | Low Temperature: −35° C. (−30), Room Temperature: 21° C., High Temperature: 85° C. Within 3 minutes after 4 hours | | |

TABLE 5

| Item | Classification | Example 1 |
|---|---|---|
| Air Bag Deployment Performance | Deployment Test (Base Line) | Normal Deployment |
| | Environmental Exposure Test (Heat Resistance Cycle) | Normal Deployment |
| | Heat Aging Test | Normal Deployment |

According to the results of Table 5, Example 1 showed normal deployment in all of the deployment test, the environmental exposure test and the heat aging test evaluated in the air bag deployment performance, and through this, it was seen that there was no abnormality in the airbag deployment performance when the final molded article containing the thermoplastic polyurethane (TPU) composition was applied to the crush pad.

Experimental Example 3

From the skin material obtained through injection molding in Example 1, a fogging test specified in Hyundai Motor Company and Kia Motors Corporation was conducted, and the results are shown in the following Table 6.

As the fogging test, 5 g of the skin material was left unattended for 5 hours at a temperature of 100° C., and then haze of glass sealed on the upper side and mounted was measured. Herein, HAZE-GARD II manufactured by Toyo Seiki Seisaku-sho, Ltd. was used as the hazemeter.

TABLE 6

| Item | Number | Example 1 |
|---|---|---|
| Fogging Test | First Time | 0.61 |
| | Second Time | 0.69 |
| | Third Time | 0.59 |
| | Average | 0.63 |

According to the results of Table 6, as for the values in the fogging test of the molded article manufactured in Example 1, the average value of 3 times and the highest value were evaluated to be lower compared to the upper limit of a general automobile standard (Hyundai Motor Company MS standard 3 or less), and it was seen that there was no problem.

Through this, it was identified that the molded article manufactured in Example 1 had no abnormality in the fogging safety performance.

Accordingly, by mixing the isocyanate, the ether-containing polyester polyol, the chain extender and the sulfonate diol in a specific content, the thermoplastic polyurethane composition according to the present disclosure provides a side chain effect in the soft segment due to chemical bonding in the polyurethane molecule and is thereby readily injection molded.

In addition, the injection molded article manufactured using the thermoplastic polyurethane composition according to the present disclosure is capable of having excellent molded article performance such as surface feel and embossing quality, excellent durability performance such as heat aging resistance, light aging resistance and abrasion resistance, and excellent safety performance such as fogging and air bag deployment performance.

Hereinbefore, embodiments of the present disclosure have been described, however, those skilled in the art will understand that the present disclosure may be implemented in other specific forms without changing the technical ideas or essential features. Therefore, it should be understood that the embodiments described above are illustrative in all aspects and not restrictive.

What is claimed is:

1. A thermoplastic polyurethane composition comprising:

0.5% by weight to 10% by weight of a sulfonate diol;

13% by weight to 60% by weight of an isocyanate;

30% by weight to 70% by weight of an ether-containing polyester polyol; and

5% by weight to 40% by weight of a chain extender.

2. The thermoplastic polyurethane composition of claim 1, wherein the sulfonate diol is a bis-1,4-((2-hydroxypropoxy)-2-propoxy)-butanesulfonate sodium salt represented by the following Chemical Formula 1:

[Chemical Formula 1]

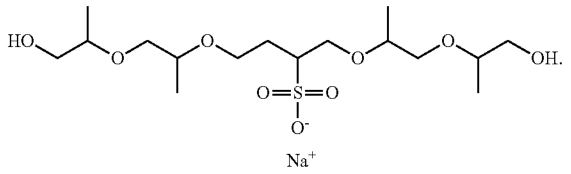

3. The thermoplastic polyurethane composition of claim 1, wherein the isocyanate comprises methylene diphenyl diisocyanate (MDI), toluene diisocyanate (TDI), hexamethylene diisocyanate (HDI), isophorone diisocyanate (IPDI), dicyclohexylmethane diisocyanate (H12MDI), or combinations thereof.

4. The thermoplastic polyurethane composition of claim 1, wherein the ether-containing polyester polyol has a hydroxyl group value in a range of 1 mgKOH/g to 250 mgKOH/g.

5. The thermoplastic polyurethane composition of claim 1, wherein the ether-containing polyester polyol comprises multifunctional carboxylic acid compounds, multifunctional alcohol compounds, polytetramethylene glycol (PTMG), or combinations thereof.

6. The thermoplastic polyurethane composition of claim 1, wherein the ether-containing polyester polyol comprises, based on a total weight thereof:

30% by weight to 70% by weight of a multifunctional carboxylic acid compound;

10% by weight to 50% by weight of a multifunctional alcohol compound; and

20% by weight to 60% by weight of polytetramethylene ether.

7. The thermoplastic polyurethane composition of claim 1, wherein the chain extender comprises 1,4-butanediol, ethylene glycol, diethylene glycol, hexanediol, hydroquinone ether, or combinations thereof.

8. The thermoplastic polyurethane composition of claim 1, further comprising:

0.1 parts by weight to 5 parts by weight of a light stabilizer; and 0.1 parts by weight to 2 parts by weight of a pigment, with respect to 100 parts by weight of a whole composition.

9. The thermoplastic polyurethane composition of claim 1, wherein the thermoplastic polyurethane composition has a melt flow index, which is measured in accordance with ISO 1133, in a range of 100 g/10 mins to 200 g/10 mins (185° C., 2.16 kg).

10. A molded article comprising:

a thermoplastic polyurethane composition having:

5% by weight to 10% by weight of a sulfonate diol;

13% by weight to 60% by weight of an isocyanate;

30% by weight to 70% by weight of an ether-containing polyester polyol; and

5% by weight to 40% by weight of a chain extender.

* * * * *